(12) United States Patent
Billing (10) Patent No.: US 8,199,904 B2
(45) Date of Patent: Jun. 12, 2012

(54) METHOD AND DEVICE FOR CREATING A MEDIA SIGNAL

(75) Inventor: Emil Billing, Svalov (SE)

(73) Assignee: Sony Ericsson Mobile Communications AB, Lund (SE)

(*) Notice: Subject to any disclaimer, the term of this patent is extended or adjusted under 35 U.S.C. 154(b) by 1079 days.

(21) Appl. No.: 12/098,718

(22) Filed: Apr. 7, 2008

(65) Prior Publication Data

US 2009/0252321 A1 Oct. 8, 2009

(51) Int. Cl.
*H04M 1/00* (2006.01)

(52) U.S. Cl. .................. 379/373.01; 379/252

(58) Field of Classification Search .................. 455/415, 455/556, 567; 379/88.2–88.24, 207.15, 245, 379/252, 373.01–373.04, 418
See application file for complete search history.

(56) References Cited

U.S. PATENT DOCUMENTS

| | | | | |
|---|---|---|---|---|
| 6,714,637 | B1 * | 3/2004 | Kredo | 379/215.01 |
| 7,831,141 | B2 * | 11/2010 | Wassingbo et al. | 396/429 |
| 2005/0114800 | A1 | 5/2005 | Rao | |
| 2005/0140519 | A1 * | 6/2005 | Smith | 340/692 |
| 2007/0036313 | A1 * | 2/2007 | White et al. | 379/142.17 |
| 2007/0121813 | A1 * | 5/2007 | Skinner et al. | 379/80 |
| 2007/0121814 | A1 * | 5/2007 | Creighton et al. | 379/88.01 |

FOREIGN PATENT DOCUMENTS

| | | |
|---|---|---|
| EP | 0 604 081 A1 | 6/1994 |
| EP | 1 662 759 A1 | 5/2006 |
| EP | 1 826 994 A2 | 8/2007 |
| JP | 2002-204286 | 7/2002 |
| WO | WO 02/07412 A1 | 1/2002 |

* cited by examiner

*Primary Examiner* — Fan Tsang
*Assistant Examiner* — Akelaw Teshale
(74) *Attorney, Agent, or Firm* — Myers Bigel Sibley & Sajovec (57) ABSTRACT

Embodiments relate to a method for rendering a media signal in a communication terminal, comprising the steps of, under control of a control unit in the communication terminal: receiving a transmission over a network, selecting media files stored in the communication terminal in a first order forming a media signal, and rendering the selected media files in the first order over an output arrangement of the communication terminal.

18 Claims, 4 Drawing Sheets

METHOD AND DEVICE FOR CREATING A MEDIA SIGNAL

TECHNICAL FIELD

The present invention relates to a method for creating a media signal. In particular, a communication terminal is provided arranged to create and render such a media signal.

BACKGROUND

Today, features in communication terminals, such as cellular phones or the like, are increasing in numbers, adding value to services used by a user of the communication terminal. A user of a communication terminal device is, in general, made attentive of an incoming call by signals rendered through speakers of the communication terminal. Different signals may be stored in the communication terminal associated to different contacts in a phonebook contact list and by associating a unique signal to each phonebook contact a user may hear who's calling without looking at the phone.

However, it is fairly time consuming of setting up different signals to users, and therefore is this feature not well used.

SUMMARY

Embodiments relate to provide a feature of a communication terminal that enhances the functionality of the communication terminal.

In some embodiments a method for rendering a media signal in a communication terminal is provided, comprising the steps of, under control of a control unit in the communication terminal: receiving a transmission over a network, selecting media files stored in the communication terminal in a first order forming a media signal, and rendering the selected media files in the first order over an output arrangement of the communication terminal. A method that enhances the functionality of the communication terminal Furthermore, in some embodiments it is disclosed a communication terminal comprising a receiver unit arranged to receive a transmission over a network, an output unit being arranged to output media signals, and a control unit arranged to select stored media files in a first order forming an assembled media signal upon reception of the transmission and to transmit the selected media files to the output unit, wherein the output unit is arranged to render the media files in the first order. A communication terminal that enhances the functionality of the communication terminal In addition, in some embodiments a computer program product is disclosed including a computer usable medium having computer program logic stored therein to enable a control unit of an communication terminal to perform the steps of receiving a transmission over a network, selecting media files stored in a memory of the communication terminal in a first order forming an assembled media signal, and rendering the media files according to the first order over an output arrangement of the communication terminal.

Embodiments disclose a communication terminal that creates what media signal to play for incoming calls depending on, for example, caller id or the like. The communication terminal should 'on the fly' create the media signal automatically for each contact/call wherein the communication terminal, in some embodiments, uses phone number or phonebook-name providing a unique media signal for each incoming call.

BRIEF DESCRIPTION OF THE DRAWINGS

Embodiments will now be described in more detail in relation to the enclosed drawings, in which.

DETAILED DESCRIPTION OF PREFERRED EMBODIMENTS

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 1:
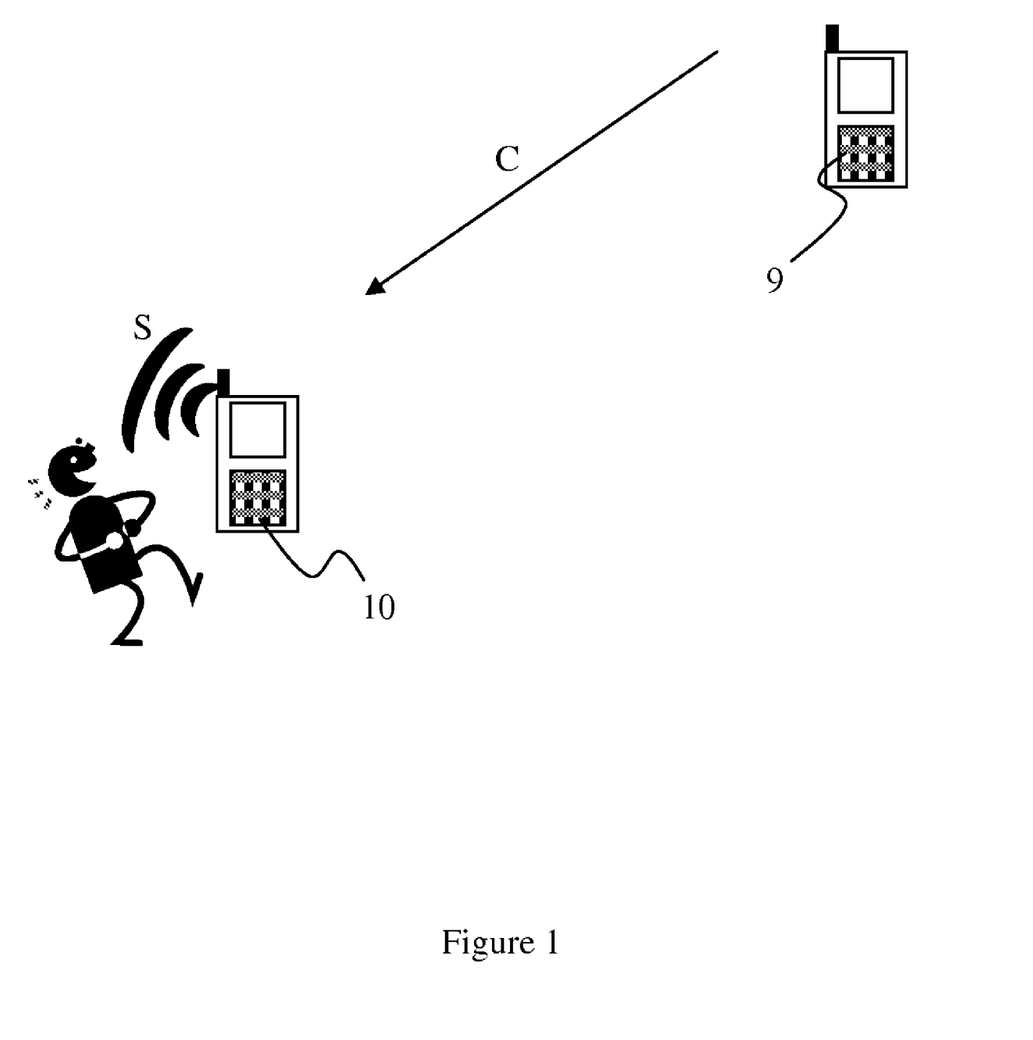
FIG. 1 shows a schematic overview of a terminal calling another terminal.

FIG. 1 discloses a schematic overview of a communication system comprising a first 9 and a second 10 communication terminal, such as a mobile terminal or the like. When the first terminal 9 calls C the second terminal 10, the second terminal 10 receives a request to set up a connection. The second terminal 10 may be informed about the origin of the call, for example, by caller ID of the first communication terminal 9. To make the user of the second communication 10 terminal attentive of the incoming call a media signal S is playback to the user and the surroundings of the second communication terminal 10. The second communication terminal 10 is arranged with a feature to assemble the media signal by selecting different media files in a first order forming an assembled media signal. The media files may be retrieved from a storage within the communication terminal 10 and the assembling may be performed randomly, based on caller ID or the like. The feature of an automatically assembled media signal enhances the functionality of the communication terminal, for example, it makes the user of the terminal more attentive to the incoming call as well as people in the surroundings and the communication terminal will be more attractive and useful.

Figure 2:
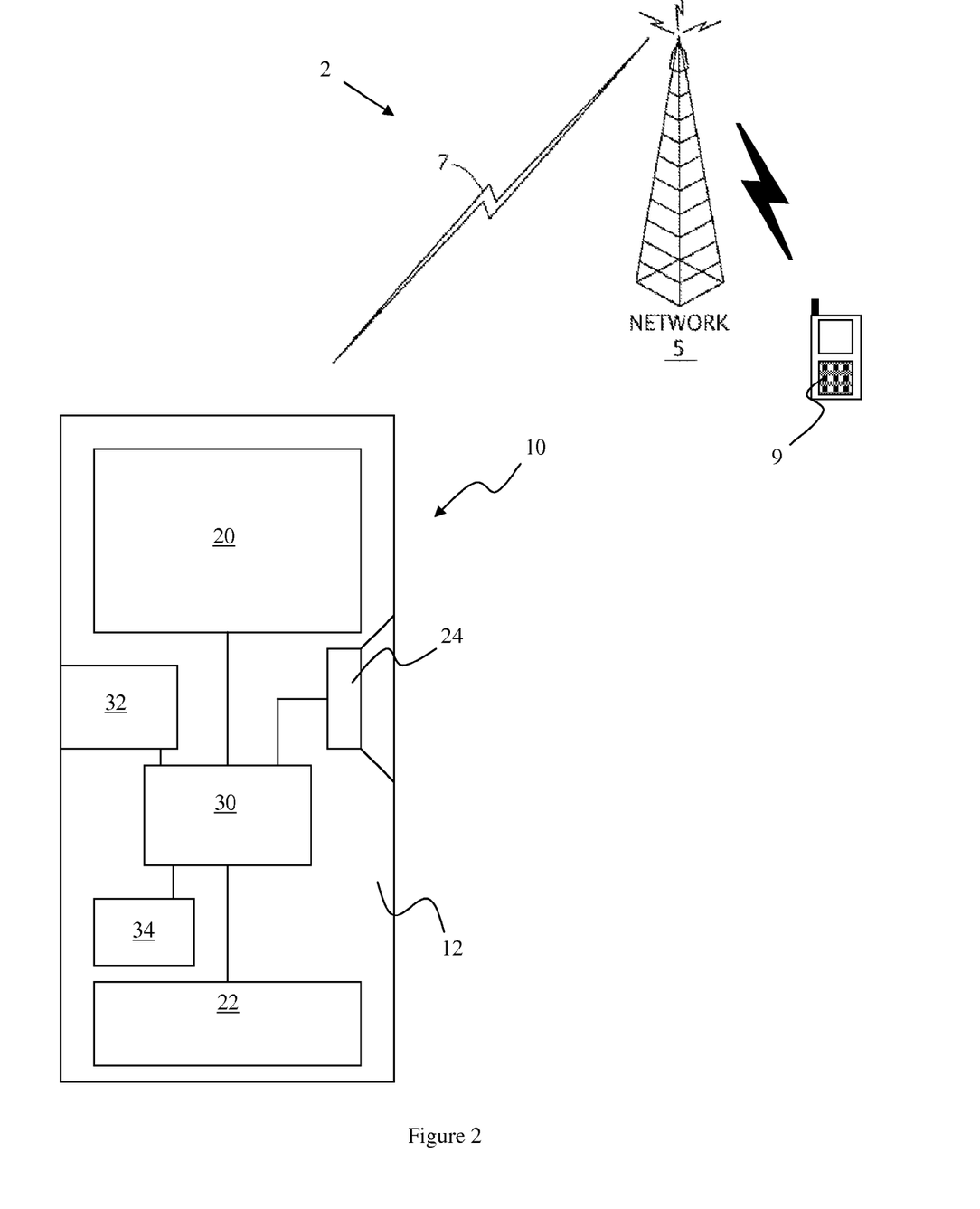
FIG. 2 shows a schematic overview of a communication terminal in a communication system.

Referring now to FIG. 2, an exemplary mobile wireless communication terminal 10 in accordance with some embodiments of the present invention is illustrated. The wireless terminal 10 is configured to communicate data with one or more other wireless terminals over a direct wireless communication interface there between, over another wireless communication interface through one or more cellular base stations, and/or over another wireless communication interface through a wireless local area network (WLAN) router.

The wireless terminal 10 may be a mobile radiotelephone forming a part of a radiotelephone communication system 2 as illustrated in FIG. 2. The system 2 includes the mobile wireless communication terminal 10 and a base station transceiver, which is part of a wireless communications network 5. In some embodiments, the network 5 includes a base station transceiver that includes the radio transceiver(s) that define an individual cell in a cellular network and communicates with the mobile terminal 10 (via an interface 7) and other mobile terminals 9 in the cell using a radio-link protocol. It will be understood that, in some embodiments of the present invention, many base station transceivers may be connected through, for example, a mobile switching centre and other devices to define the wireless communications network 5.

The mobile terminal 10 in the illustrated embodiment includes a portable housing assembly 12, a display 20, a user interface (that is, a man machine interface (MMI)) including a speaker 24 (that is, a sound transducer) and input arrangement 22, such as a keypad, a control unit 30, a communication module 32, and a memory 34. The foregoing components of the mobile terminal 10 may be included in many conventional mobile terminals and their functionality is generally known to those skilled in the art. The mobile terminal 10 further includes one or more applications, which may be stored in the memory 34.

The display 20 may be any suitable display screen assembly. For example, the display screen 28 may be a liquid crystal display (LCD) with or without auxiliary lighting (e.g., a lighting panel).

The user interface may include any suitable input device(s) 22 including, for example, a touch activated or touch sensitive device (for example, a touch screen wherein the display is combined with the input arrangement), a joystick, a keyboard/keypad, a dial, a directional key or keys, and/or a pointing device (such as a mouse, trackball, touch pad, etc.). The speaker 24 generates sound responsive to an input audio signal. The user interface can also include a microphone coupled to an audio processor that is configured to generate an audio data stream responsive to sound incident on the microphone.

The control unit 30 may support various functions of the communication terminal 10 and may be any commercially available or custom microprocessor/CPU, for example. In use, the control unit 30 of the communication terminal 10 generates a display image on the display 20 and/or audio data on the speaker 24.

The memory 34 is configured to store digital information signals and data such as digital media signals, digital media files, for example, digital audio signals, digital images, digital video clips and/or digital audio files, short digital wave files, phonebook contact list or similar.

The communication module 32 is configured to communicate data over one or more wireless interfaces to, for example, another remote wireless terminal 9. The communication module 32 may include a cellular communication module, a direct point-to-point connection module, and/or a WLAN module.

With a cellular communication module, the wireless terminal 10 can communicate via the base station(s) of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

The communication module 32 can include a transceiver typically having a transmitter circuit and a receiver circuit, which respectively transmit outgoing radio frequency signals (for example, to the network 5, a router or directly to another terminal) and receive incoming radio frequency signals (for example, from the network 5, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the mobile terminal 10 and the network 5, router or other terminal may include both traffic and control signals (for example, paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other communication terminals via an IR port.

The mobile terminal 10 may include further components such as a camera device configured to generate a still image and/or video data stream based on incident light.

According to some embodiments, the mobile terminal 10 is a handheld mobile terminal. By "handheld mobile terminal," it is meant that the outer dimensions of the mobile terminal are adapted and suitable for use by a typical operator using one hand. According to some embodiments, the total volume of the handheld mobile terminal 10 is less than about 200 cc. According to some embodiments, the total volume of the handheld terminal 10 is less than about 100 cc. According to some embodiments, the total volume of the handheld mobile terminal 10 is between about 50 and 100 cc. According to some embodiments, no dimension of the handheld mobile terminal 10 exceeds about 200 mm.

In the memory 34 a tone creating application is stored wherein the application is arranged to create media signals, ring tones, of small stored media files when executed on the control unit 30. The media signals are built up of many different small sounds/videos that combined creates interesting combinations. Different settings/'themes' can be set to tweak the media signals in different angles, such as, mechanical noises, animal sounds, funny noises, musical instruments and/or the like. The small sounds/videos, sound/video samplings, may be stored in categories, enabling the feature to determine manually which media files of certain categories to be assembled into media signals.

In some embodiments the media signal is randomly assembled wherein a user of a communication terminal will experience a ringing tone that is constantly changing adding a function to the communication terminal. Furthermore, the media signal may be assembled by basing the assembling on contacts in the phonebook.

Furthermore, the control unit 30 is arranged to render media files, such as files of audio formats, still images, moving images or the like, over the speaker 24 and/or the display 20 when the signal application is executed thereon.

As an example, a call is received at the communication module 32 comprising a caller ID. As an optional step, the control unit 30 in the communication terminal analyses the incoming call by comparing the caller ID to the numbers stored in the Phonebook contact list. If a match is found the control unit 30 starts assembling a media signal selecting media files based on the stored name of the matching caller ID. This assembled media signal is then rendered and out putted over the speaker arrangement. As an example, contact Steve may generate a media signal of 'Elephant, Elephant, bird tweet' and contact Vivian is 'bird tweet, guitar solo, bird tweet, congas'.

The phonebook contact list may be stored in a local memory of the communication terminal or a removable memory such as a SIM-card.

As a result of some embodiments a user of a communication terminal does not have to create and/or associate the media signal to a contact. Instead, the control unit of the communication terminal creates when executing the application a media signal for a contact automatically.

A user of the communication terminal may optionally set the phone to merely play a certain category of sounds, for example, drum beats, wherein the communication terminal merely will render different assembled drum sounds.

Figure 3:
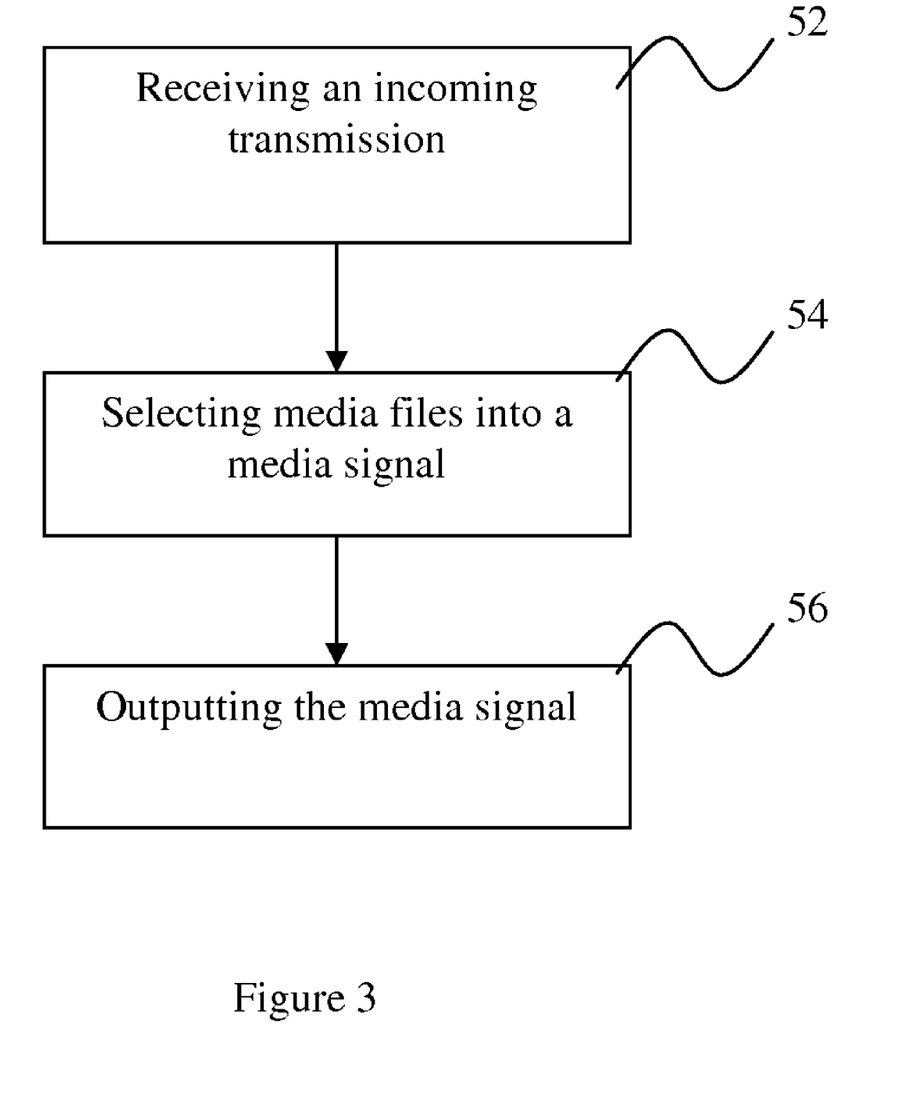
FIG. 3 shows a schematic flow chart of a method for rendering a media signal.

In FIG. 3, a schematic flowchart of a method for creating and playback a media signal is shown.

In step 52, an incoming transmission, such as a request for setting up a call, a SMS, an MMS, an email or the like, is received at a communication terminal from a second communication terminal. The set up message may be according to any standard such as GSM, GPRS, WCDMA, or the like, over a circuit switched, packet switched wireless/wired network. The transmission may contain information concerning origin of the request, for example, a caller identity phone number.

In step 54, a control unit of the communication terminal selects different media files stored in the communication terminal, such as audio files, video files or the like, into a media signal. The selecting is performed in real time and the assembled media files may be selected based on the information of the origin of the request or randomly. Furthermore, media files may be selected based on the presence of the caller identity number in the phonebook contact list of the communication terminal. That is, the media signal may be assembled in a certain manner if the caller identity is in the phonebook contact list of the communication terminal and assembled in a different manner if not being in the phonebook contact list. The media signal may further be arranged in one manner if the caller identity is stored in the phonebook contact list and associated with a certain group of contacts. For example, contacts from a group "colleagues" always start with a media file of a flushing toilette and contacts from a group "Family" always start with a media file of a singing bird.

In step 56, the control unit sends the assembled media signal to the speaker, resulting in a generated media signal that is out putted. It should here be noted that the selected media files may continuously be transmitted one by one as the files are selected and rendered at the output arrangement in the selected order. The process of selecting and transmitting media files is very rapid resulting in that the assembled media file is presented without interruptions.

I should be noted that the selection may be performed semi randomly based on the number of the caller identity, for example, where numbers start with certain digits the tone signal starts with a media file from a certain category and the like.

In some embodiments the media signal is assembled based on the number, forward or backward. It may be based on the sum of the number plus the two last digits of the number. Any combination of numbers is possible and in order to assemble a unique sound for every calling number the selection may be based on the number in the reverse direction as numbers often start with the same digits. Alternatively, the selection may be based on the sum of the number followed by the last, for example, two digits. As an example, number 050-52435 starts with the sound nr 24 (car), followed by sound 5 (baby) and 3 (burp), the very similar number 050-52434 will be assembled as sound nr 23 (scream), followed by nr 4 (flush) and 3 (burp).

The assembled media signal may be based on the name of the caller ID in the phonebook contact list. For example, media files are associated to certain letters resulting in that the assembled signal for "Anna" is, for example, A='Cry', N='Whistle', N='Whistle', A='Cry'.

Figure 4:
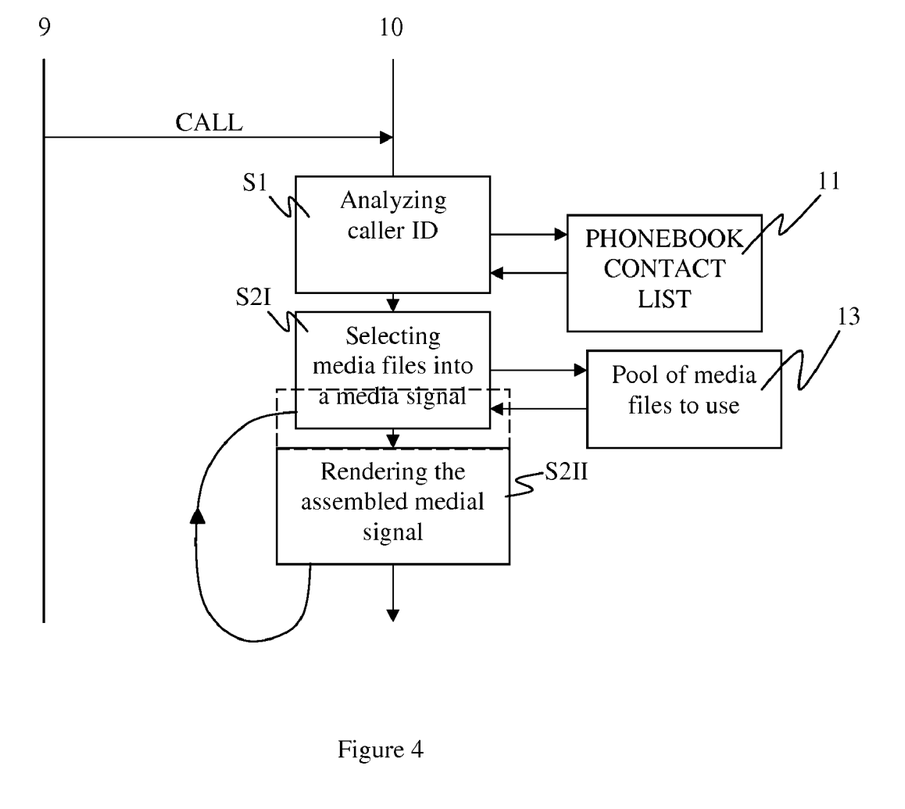
FIG. 4 shows a schematic scheme of a method for rendering a media signal.

In FIG. 4, a schematic scheme of a method for rendering a media signal is disclosed.

A first terminal 9 calls a second terminal 10 using communications terminals, such as a telephone, a wireless phone or the like. The second terminal 10 receives the incoming call and is arranged to analyze S1 the incoming call by, for example, comparing the caller ID, the originating telephone number, to entries in a phonebook contact list 11 stored on a removable memory or in the second terminal 10. If a match is found the second terminal is arranged to assemble the media signal based on the entry in the phonebook contact list by selecting S2I media files, such as samplings of sound or the like, according to a selector formula resulting in a media signal based on the entry. The media files are stored in pool of media files 13, and the pool 13 may be structured by categorizing media files into categories. The selecting of media files and appending the selected media files to the final product is performed in a loop until the full entry is associated to the media signal according to the set formula.

The assembled media signal is then rendered over an output arrangement S2II. The media signal may be rendered as one file or rendered as a number of media files continuously fed one by one to the output arrangement as the media files are selected by the control unit according to the selection formula. This means that the media file is rendered directly after it is selected making the process faster in time. This is shown as optionally by dashed lines from the rendering box into the assembling box in FIG. 4.

The process may be repeated until the second user responds to the incoming call/caller hangs up/voice mail is initiated or the like.

The assembled media signal is assembled in real time but it may also be stored in a memory, for example, associated with a number of the caller. The assembled media signal may be stored to be used later separately, for example, an assembled signal may be sent to a central server for others to download or the like.

If the transmission is from an unlisted number, the assembled media signal may be randomly assembled or starting with a sound file from a certain category, or the like.

The assembling or processing of selecting media files may be performed and then played in a loop until the user answers/voice mail comes on, the caller hangs up or the like.

The media files may be stored in an internal memory of the communication terminal as well as on a memory stick/SIM card or the like. Media files may be updated periodically/downloaded from a sound file server or the like.

In some embodiments, a communication terminal is arranged to assemble media signals that are multimedia signals, that is, media signals comprising samplings of pictures, still or moving, and audio. The rendered signal may then be an audio-visual signal.

Referring back to FIG. 3, in some embodiments, a method for rendering a media signal in a communication terminal is provided, comprising the steps of, under control of a control unit in the communication terminal: receiving a transmission over a network 52, selecting media files stored in the communication terminal in a first order forming a media signal 54, and rendering the selected media files in the first order over an output arrangement of the communication terminal 56.

It should here be noted that stored in the communication terminal means stored in a memory of the communication terminal, in a removable memory such as SIM-card, memory stick or the like.

In some embodiments, the selecting step is performed randomly.

In some embodiments, the transmission comprises information of the caller identity and the selecting step is based on the caller identity.

The method may further comprise the optional step (se step S1 in FIG. 4) of determining that the caller identity is stored with a name in a phonebook contact list in the communication terminal and wherein the selecting step is based on the name in the phonebook.

In some embodiments, selected media files are transmitted continuously one by one to the output arrangement and rendered as the selection is made.

In some embodiments, the selected media files are appended to each other and then transmitted to the output arrangement.

In some embodiments, the media files comprise audio files.

In some embodiments, the media files are stored in different categories, such as sports, animals, instruments, funny noises and/or the like and the selecting step is preset to select media files in at least one category.

In some embodiments, the selecting step is performed on basis of the format of the received transmission, such as a SMS, MMS, email or a call.

In order to perform the method a communication terminal is provided comprising a receiver unit 32 arranged to receive a transmission over a network, an output unit 20,24 being arranged to output media signals, and a control unit 30 arranged to select stored media files in a first order forming an assembled media signal upon reception of the transmission and to transmit the selected media files to the output unit 20, 24, wherein the output unit 20, 24 is arranged to render the media files in the first order.

In some embodiments, the control unit 30 is arranged to select the media files upon determination that the transmission is originating from a caller stored as a contact in a phonebook contact list of the communication terminal based on the contact.

In some embodiments, the control unit 30 is arranged to select the media files forming the assembled media signal randomly.

In some embodiments, the control unit 30 is arranged to select the media files based on an originating calling number of the transmission.

In some embodiments, the media files are stored in a memory 34 of the communication terminal and categorised into categories and the control unit 30 is arranged to select media files in set categories.

In some embodiments, the control unit 30 is arranged to select media files based on a format of the transmission.

In some embodiments, the media files comprises audio files and the output unit 20, 24 comprises a speaker arrangement 24.

In some embodiments, the media files comprises visual files and the output unit 20, 24 comprises a display arrangement 20.

In addition, a computer program product is provided including a computer usable medium having computer program logic stored therein to enable a control unit of an communication terminal to perform the steps of receiving a transmission over a network, selecting media files stored in a memory of the communication terminal in a first order forming an assembled media signal, and rendering the media files according to the first order over an output arrangement of the communication terminal.

In some embodiments, the selecting step of the computer program product is performed randomly.

In some embodiments, the transmission comprises information of the caller identity and the selecting step of the computer program product is based on the caller identity.

In some embodiments, the computer program product is further arranged to perform the step of determining that the caller identity is stored with a name in a phonebook contact list in the communication terminal and the selecting step is based on the name in the phonebook.

In some embodiments, the media files are stored in different categories, such as sports, animals, instruments, funny noises and/or the like, and the selecting step of the computer program product is preset to select media files in at least one category.

In some embodiments, the selecting step is performed on basis of a format of the received transmission, such as a SMS or a call.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method for rendering a media signal in a communication terminal under control of a control unit in the communication terminal, the method comprising:
   receiving a transmission over a network, wherein the transmission comprises information of a caller identity,
   when receiving the transmission, automatically selecting in real time media files stored in the communication terminal in a first order according to a selector formula, wherein each media file is associated with a certain letter and the selector formula assembles a media signal of media files according to the letters of a name in a phonebook contact list in the communication terminal associated with the caller identity, and
   rendering the selected media files in the first order in order to output a ringtone over an output arrangement of the communication terminal, wherein selected media files are transmitted continuously one by one to the output arrangement and rendered as the selection is made.

2. A method according to claim 1, further comprising determining that the caller identity is stored with a name in a phonebook contact list in the communication terminal and wherein the selecting step is performed based on the name in the phonebook.

3. A method according to claim 1, wherein the media files comprise audio files.

4. A method according to claim 1, wherein the media files are stored in different categories.

5. A method according to claim 4, wherein the selecting step is preset to select media files in at least one category.

6. A method according to claim 1, wherein the selecting step is performed on basis of the format of the received transmission.

7. A method according to claim 1, wherein the media files are associated with certain letters of the name in the phonebook.

8. A method according to claim 1, wherein the selecting step is preset to select media files in certain manner based on a group of contact of the caller identity.

9. A communication terminal comprising:
   a receiver unit arranged to receive a transmission over a network, wherein the transmission comprises information of a caller identity,
   an output unit being arranged to output media signals, and
   a control unit arranged, when the transmission is received, to automatically select in real time stored media files in a first order according to a selector formula, wherein each media file is associated with a certain letter and the selector formula is arranged to assemble a media signal of media files according to the letters of a name in a phonebook contact list in the communication terminal associated with the caller identity, and to transmit the selected media files continuously one by one to the output unit, wherein the output unit is arranged to render the media files in the first order in order to output a ringtone as the selection is made.

10. A communication terminal according to claim 9, wherein the control unit is arranged to select the media files upon determination that the transmission is originating from a caller stored as a contact in a phonebook contact list of the communication terminal based on the contact.

11. A communication terminal according to claim 9, wherein the media files are stored in a memory of the communication terminal and categorised into categories and the control unit is arranged to select media files in set categories.

12. A communication terminal according to claim 9, wherein the control unit is arranged to select media files based on a format of the transmission.

13. A communication terminal according to claim 9, wherein the media files comprise audio files and the output unit comprises a speaker arrangement.

14. A communication terminal according to claim 9, wherein the media files comprise visual files and the output unit comprises a display arrangement.

15. A computer program product including a non-transitory computer usable medium having computer program logic stored therein to enable a control unit of an communication terminal to perform the steps of:
- receiving a transmission over a network, wherein the transmission comprises information of a caller identity,
- selecting media files stored in a memory of the communication terminal in a first order according to a selector formula, wherein each media file is associated with a certain letter and the selector formula assembles a media signal of media files according to the letters of a name in a phonebook contact list in the communication terminal associated with the caller identity, and
- rendering the media files according to the first order in order to output a ringtone over an output arrangement of the communication terminal.

16. A computer program product according to claim 15, wherein the computer program product is further arranged to perform the step of determining that the caller identity is stored with a name in a phonebook contact list in the communication terminal and the selecting step is based on the name in the phonebook.

17. A computer program product according to claim 15, wherein the media files are stored in different categories and the selecting step is preset to select media files in at least one category.

18. A computer program product according to claim 15, wherein the selecting step is performed on basis of a format of the received transmission.

* * * * *